United States Patent [19]

Shimada et al.

[11] Patent Number: 4,711,668
[45] Date of Patent: Dec. 8, 1987

[54] AQUEOUS INK COMPOSITION

[75] Inventors: Masaru Shimada, Shizuoka; Toshiyuki Kawanishi, Numazu; Kakuji Murakami, Shizuoka; Tamotsu Aruga, Numazu; Hiroyuki Uemura, Numazu; Kiyofumi Nagai, Numazu, all of Japan

[73] Assignee: Ricoh Company, Ltd., Tokyo, Japan

[21] Appl. No.: 851,248

[22] Filed: Apr. 14, 1986

[30] Foreign Application Priority Data

Apr. 17, 1985 [JP] Japan .................. 60-080055

[51] Int. Cl.$^4$ .............................................. C09D 11/02
[52] U.S. Cl. .......................................... 106/22; 106/20
[58] Field of Search ............... 106/20, 22; 534/820, 534/732

[56] References Cited

U.S. PATENT DOCUMENTS

| | | | |
|---|---|---|---|
| 2,148,135 | 2/1939 | Rossander | 534/820 |
| 3,113,937 | 12/1963 | Nakaten et al. | 534/820 |
| 3,816,118 | 6/1974 | Byrne | 430/56 |
| 3,846,141 | 11/1974 | Ostergren et al. | 106/22 |
| 4,118,232 | 10/1978 | Piller et al. | 534/820 |

Primary Examiner—Amelia Burgess Yarbrough
Attorney, Agent, or Firm—Oblon, Fisher, Spivak, McClelland, & Maier

[57] ABSTRACT

An aqueous ink composition comprising a water-soluble dye having the formula (I) in an amount sufficient for ink printing and water,

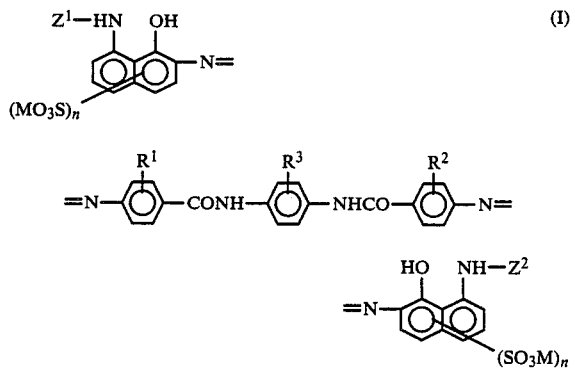

wherein $R^1$ and $R^2$ each represent hydrogen, a lower alkyl group, a lower alkoxy group or halogen; $R^3$ represents hydrogen, a lower alkyl group, a lower alkoxy group, halogen, a sulfonic acid group or a sulfonate group; $Z^1$ and $Z^2$ each represent hydrogen, a lower alkyl group, a phenyl group, an acetyl group, an alkyl sulfonyl group, a benzoyl group which may have a substituent, a benzenesulfonyl group which may have a substituent, or a 1,3,5-triazine group which may have a substituent; M represents hydrogen, an alkali metal or $NH_4^+$; and n is an integer of 1 or 2.

8 Claims, No Drawings

AQUEOUS INK COMPOSITION

BACKGROUND OF THE INVENTION

The present invention relates to an aqueous ink composition suitable for use as printing ink and stamping ink in general use, and for use with writing instruments, recording apparatus or the like. More particularly, it relates to an aqueous magenta ink composition for ink-jet printing, which is capable of yielding printed images with high quality (i.e., high clearness and sharpness, etc.), and with excellent resistance to water and light, and which is also capable of providing stable ink ejection, without causing the plugging of the nozzles of the ink-jet printing apparatus, even if it is used continuously for a long period of time or it is used intermittently after a period of non-use of the ink-jet printing apparatus.

Generally, an aqueous ink for ink jet-recording comprises as the main components a dye, a humectant such as a polyhydric alcohol or an ether thereof, and water, and when necessary, additives such as an anti-mold agent.

An aqueous ink for use in ink-jet recording should satisfy the following conditions in order to yield an excellent print over an extended period of time:

First, in order that the ink be compatible with ink droplet formation and control of the direction of the ejected ink droplet streams, it is necessary that its viscosity, surface tension, specific electric conductivity, and density each fall within certain appropriate ranges.

Second, it is necessary that no precipitates be separated, due to coagulation, precipitation, chemical change of slightly soluble components or other causes, from the ink during an extended period of continuous use or storage, or during the periods when the apparatus is not in use. Nor should the physical properties of the ink otherwise change during the above-mentioned periods. If the separated solid components or viscous materials in the ink become affixed around the nozzles, or if the physical properties of the ink change, deviating from the predetermined physical properties achieved at the time of the preparation, the desired recording quality, the desired ink ejection stability, and the desired ink ejection response cannot be obtained.

Third, it is necessary that the ink provide adequately high contrast, clearness and the desired color in the printed image, in particular, for use with full-color printers.

Fourth, it is necessary that the ink for ink-jet recording be such that the printed images are resistant to water, light and physical wear.

Fifth, it is necessary that the images printed by the ink dry rapidly.

In order to satisfy the above first through fourth conditions, it is preferable that the molecular extinction coefficient of the dye employed in the ink composition be high and the solubility of the dye in water and the humectant be also high.

In the conventional magenta aqueous ink compositions, for example, direct dyes such as C.I. Direct Red 1, C.I. Direct Red 11, C.I. Direct Red 37, C.I. Direct Red 62, C.I. Direct Red 75, C.I. Direct Red 87, C.I. Direct Red 89, C.I. Direct Red 95, and C.I. Direct Red 227; and acid dyes such as C.I. Acid Red 1, C.I. Acid Red 8, C.I. Acid Red 87, C.I. Acid Red 94, C.I. Acid Red 115, C.I. Acid Red 131, C.I. Acid Red 144, C.I. Acid Red 152, C.I. Acid Red 154, C.I. Acid Red 186 and C.I. Acid Red 245 are employed.

However, the ink compositions comprising the direct dyes, when used in ink jet-printing, have the shortcomings that (a) the plugging of the nozzles is caused in the course of continuous printing or at the time of intermittent use because of the poor solubility of the direct dyes in water and the humectant, and that (b) the color reproduction is poor. When the aqueous ink compositions comprising the acidic dyes are employed, the durability of the printed images is unsatisfactory because of the poor resistance to light and water.

So far, many proposals have been made for an ink for ink-jet recording, but from the viewpoint of practical use, a satisfactory ink composition which is capable of meeting the above-described requirements has not been found.

SUMMARY OF THE INVENTION

It is therefore an object of the present invention to provide a magenta aqueous ink composition for ink jet recording from which the above discussed conventional shortcomings have been eliminated, thereby satisfying the above outlined requirements for ink jet-recording. That is to say, the object of the present invention is to provide a magenta aqueous ink composition for ink-jet recording which does not result in plugging of the nozzles, does not change in quality or separate precipitates therefrom with time during storage, but exhibits excellent ink-ejection stability, and has good ink ejection response, shows slight changes in physical properties, if any, when used for a long period with continuous recirculation, or when used intermittently, and yields printed images which are non-spreading, and have high sharpness, high image density, and high resistance to water and light.

The above object of the present invention is attained by a magenta aqueous ink composition comprising a water-soluble dye having the following formula (I) and water, optionally with addition of a humectant and other additives thereto:

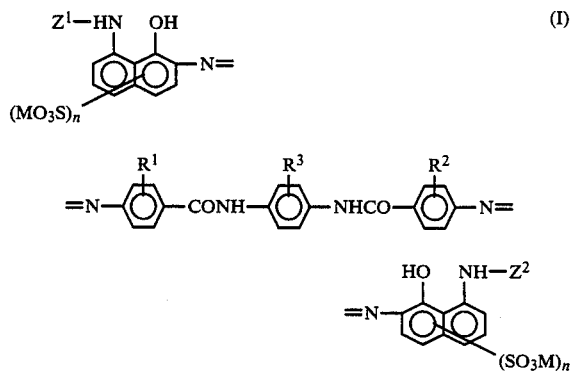

wherein $R^1$ and $R^2$ each represent hydrogen, a lower alkyl group, a lower alkoxy group or halogen; $R^3$ represents hydrogen, a lower alkyl group, a lower alkoxy group, halogen, a sulfonic acid group or a sulfonate group; $Z_1$ and $Z^2$ each represent hydrogen, a lower alkyl group, a phenyl group, an acetyl group, an alkyl sulfonyl group, a benzoyl group which may have a substitutent selected from the group consisting of a lower alkyl group, a lower alkoxy group and halogen, a benzenesulfonyl group which may have a substituent selected from the group consisting of a lower alkyl group, a lower alkoxy group and halogen, or a 1,3,5-triazine group which may have a substituent selected from the group consisting of an alkyl group, an alkoxy group, a hydroxyl group, halogen, a hydroxyalkyl amino group, an alkyl amino group and an aromatic amino group; M represents hydrogen, an alkali metal or $NH_4^+$; and n is an integer of 1 or 2.

DETAILED DESCRIPTION OF THE PREFERRED EMBODIMENTS

In the present invention, the dye having the above described formula (I) is contained in the aqueous ink composition in a sufficient amount for ink printing. More specifically, it is preferable that the dye be contained in an amount of 0.5 to 20 parts by weight, more preferably in an amount of 1.5 to 6 parts by weight, with respect to 100 parts by weight of the ink composition according to the present invention, in order to obtain sufficient coloring performance of the dye as a colorant and to avoid the precipitation of the dye during an extended period of continuous use and storage or during the periods when the ink-jet printing apparatus is not in use, thereby preventing the plugging of the nozzles with the precipitates.

Specific examples of the dyes represented by the formula (I) for use in the present invention are as follows:

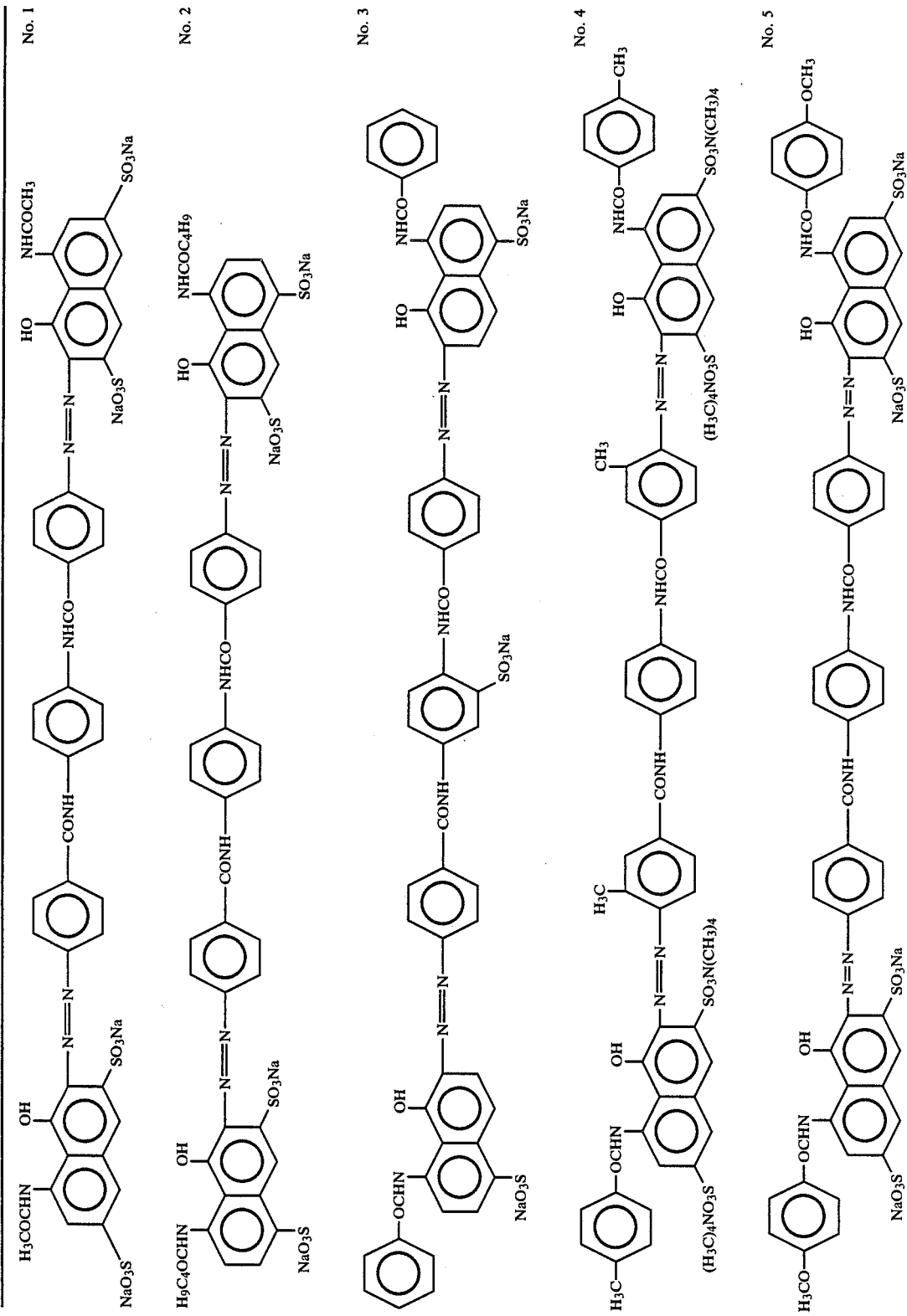
TABLE 1

TABLE 1-continued
No. 6 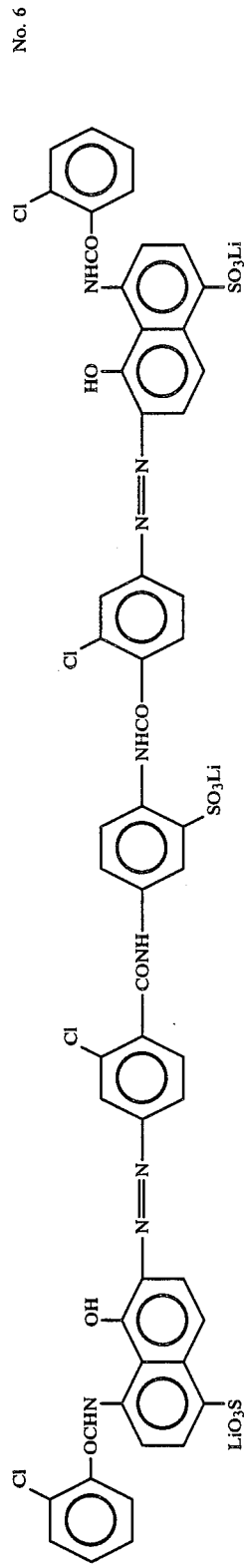
No. 7 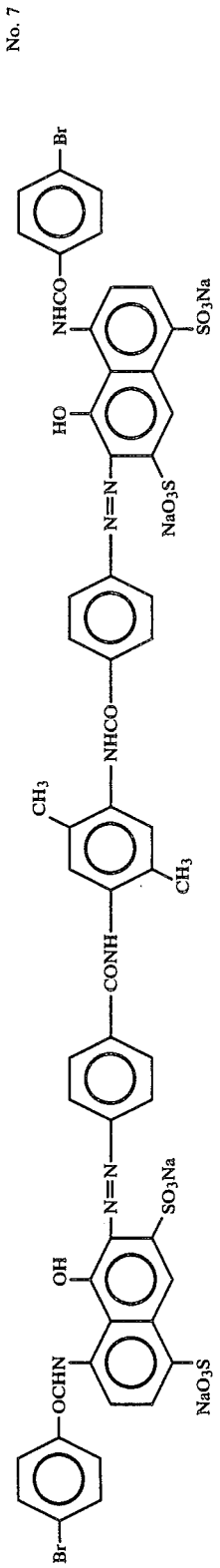
No. 8 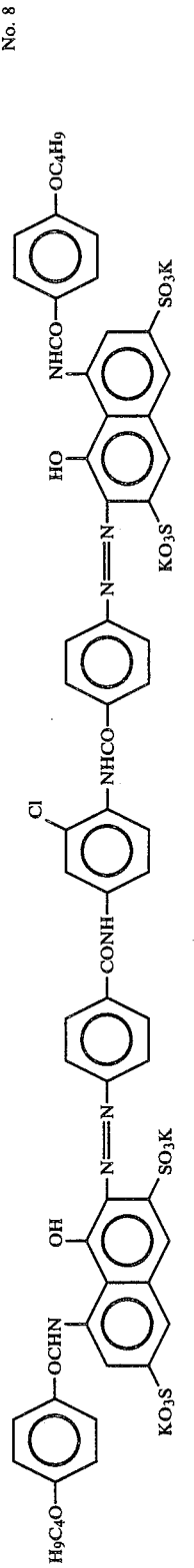
No. 9 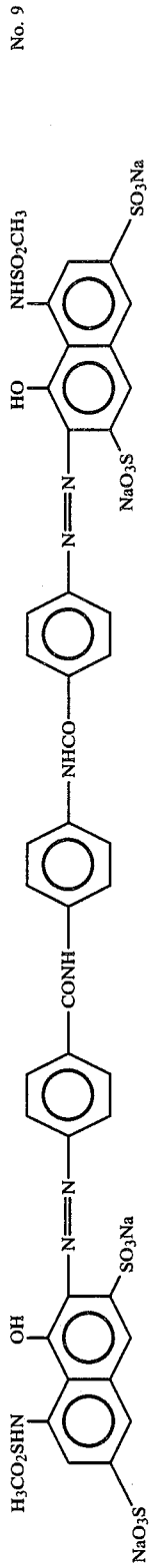
No. 10 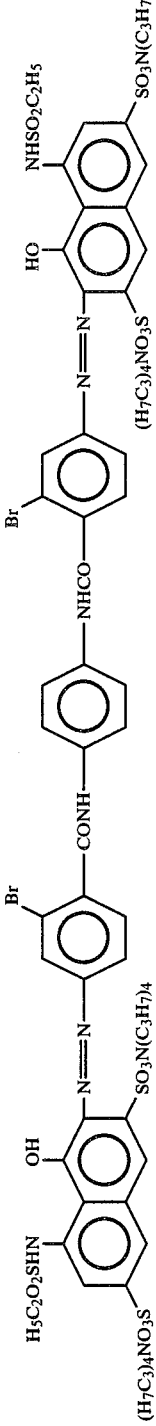

TABLE 1-continued

TABLE 1-continued
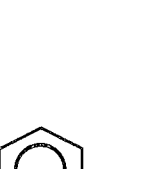
No. 16
No. 17
No. 18
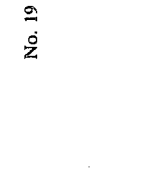
No. 19
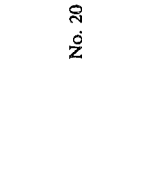
No. 20

TABLE 1-continued
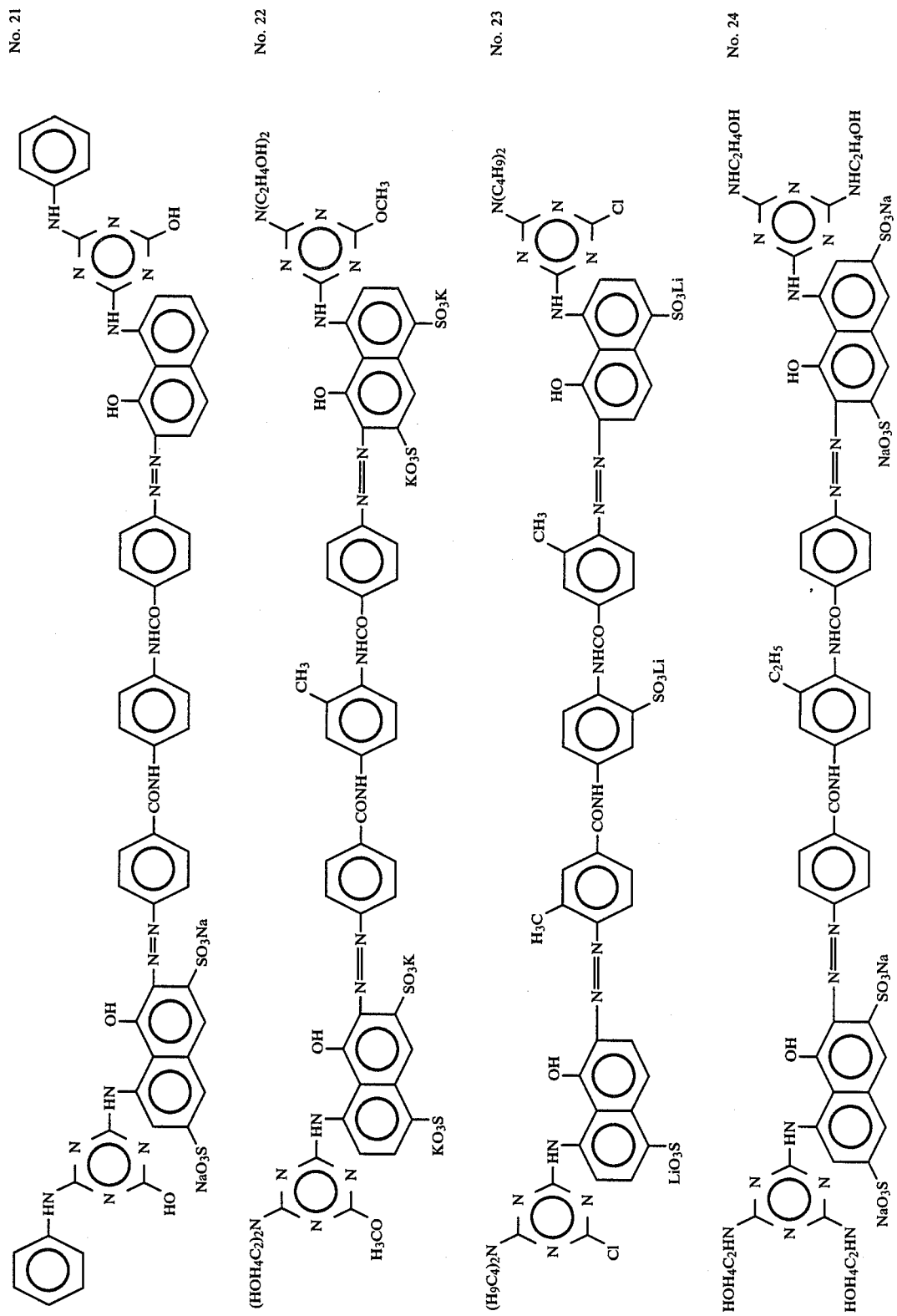

TABLE 1-continued
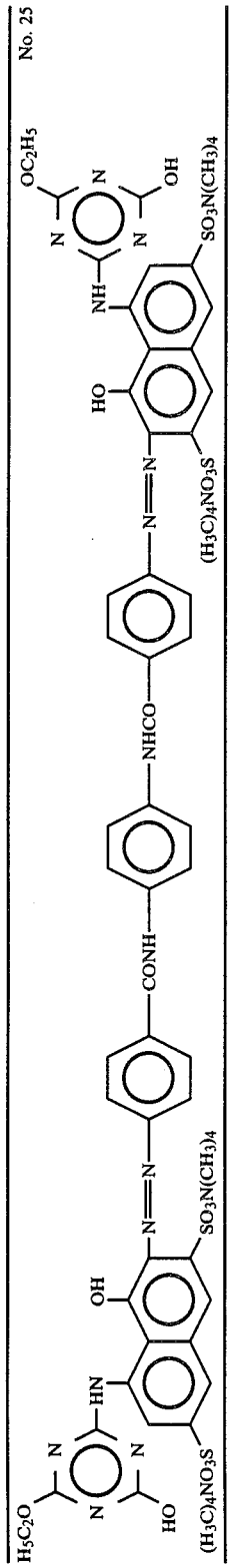

The above dyes can be synthesized without difficulty. For example, Dye No. 12 can be synthesized by subjecting N,N'-bis(4-aminobenzoyl)-p-phenylenediamine to tetera-azotization by a conventional method, followed by coupling the tetra-azo product with N-(p-toluenesulfonyl) H acid in mildly alkaline solution.

In the present invention, water is used as a base solvent of the ink composition. For the purpose of adjusting the physical properties of the ink composition so as to have the desired properties, to control the drying speed of the ink composition and to increase the solubility of the dye employed in the solvent of the ink composition, the following water-soluble organic solvents (humectants) can be used together with water:

Polyhydric alcohols, such as ethylene glycol, diethylene glycol, triethylene glycol, polyethylene glycol, poly-propylene glycol and glycerin; alkyl ethers of polyhydric alcohols, such as ethylene glycol monoethyl ether, ethylene glycol monobutyl ether, diethylene glycol monomethyl ether, diethylene glycol monoethyl ether, diethylene glycol monobutyl ether, triethylene glycol monomethyl ether and triethylene glycol monoethyl ether; and other compounds such as N-methyl-2-pyrrolidone, 2-pyrrolidone, 1,3-dimethyl imidazolidinone, dimethylformamide and triethanolamine.

Of the above mentioned humectants, the most preferable humectants are diethylene glycol, polyethylene glycol (200 to 600), triethylene glycol, ethylene glycol, glycerin and N-methyl-2-pyrrolidone, by which the solubility of the employed dye in the solvent of the ink composition can be increased and the evaporation of water from the ink composition can be appropriately controlled, so that the initial properties of the ink composition can be maintained even for an extended period of continuous use or storage, or during the periods when the apparatus is not in use. Thus reliable ink droplet stability and ink droplet ejection response of the ink composition, particularly after a prolonged period of non-use of the apparatus, are obtained.

In the present invention, it is preferable that the above humectant be contained in an amount of 5 to 80 parts by weight, more preferably 10 to 40 parts by weight, with respect to 100 parts by weight of the ink composition according to the present invention, from the viewpoint of obtaining an appropriate viscosity and drying speed of the ink composition.

In the present invention, in addition to the above humectants, additives, for instance, preservative and anti-mold agents, pH adjustment agents, specific electric conductivity adjustment agents, chelating agents and anti-rusting agents, can be added to the ink composition.

As preservative and anti-mold agents, for example, sodium dehydroacetate, sodium sorbate, 2-pyridine thiol-1-oxide sodium salt, sodium benzoate and sodium pentachlorophenol can be employed.

As pH adjustment agents, any materials can be used optionally, so long as they do not have any adverse effect on the ink composition and can control the pH of the ink composition within the range of pH 9.0 to 11.0. Specific examples of such pH adjustment agents are amines, such as diethanolamine and triethanolamine; hydroxides of alkali metals, such as lithium hydroxide, sodium hydroxide and potassium hydroxide; ammonium hydroxide; and carbonates of alkali metals, such as lithium carbonate, sodium carbonate and potassium carbonate.

As specific electric conductivity adjustment agents, inorganic salts such as potassium chloride, ammonium chloride, sodium sulfate and sodium carbonate, and water-soluble amines such as triethanolamine can be employed.

As chelating agents, for example, sodium ethylenediaminetetraacetate, trisodium nitrilotriacetate, hydroxyethyl ethylenediamine trisodium acetate, diethylene triamino pentasodium acetate and uramil disodium acetate can be employed.

As rust preventing agents for the nozzles, for example, acid sulfites, sodium thiosulfate, ammonium thioglycolate, diisopropyl ammonium nitrite, pentaerythritol tetranitrate and dicyclohexyl ammonium nitrite can be employed.

Other additives, for example, water-soluble ultra-violet-ray-absorbing agents, water-soluble infrared-ray-absorbing agents, water-soluble polymeric compounds, solubility increasing agents for increasing the solubility of the dye dissolved in the solvent of the ink composition, and surfactants can be employed as thought necessary in specific embodiments of an aqueous ink composition for ink-jet recording according to the present invention.

Preferred embodiments of an aqueous ink composition for ink-jet recording according to the present invention will now be explained by referring to the following examples:

EXAMPLE 1

A mixture of the following components was heated to about 50° C. and stirred until completely dissolved. The mixture was then filtered twice through a membrane filter with a 0.22 μm mesh, whereby an aqueous ink composition No. 1 according to the present invention was prepared:

|  | wt. % |
|---|---|
| Dye No. 3 in Table 1 | 3.0 |
| Diethylene glycol | 15.0 |
| Glycerin | 5.0 |
| Sodium dehydroacetate | 0.1 |
| Ion-exchanged water | 76.9 |

The properties of the thus prepared aqueous ink composition were as follows:

| | |
|---|---|
| pH | = 10.1 (25° C.) |
| Viscosity | = 1.95 cp (25° C.) |
| Surface tension | = 56.0 dynes/cm (25° C.) |
| Water resistance (indicated by fading ratio) | = 4.8% |
| Light resistance (indicated by fading ratio) | = 8.5% |

In the above, the water resistance of the ink composition indicated by fading ratio was measured as follows:

The aqueous ink composition No. 1 was diluted with ion-exchanged water to the extent that the concentration of Dye No. 3 contained in the ink composition was 1 wt. %. The thus diluted ink composition was applied to a sheet of high quality paper by use of a doctor blade and was then dried at room temperature for one day to prepare a test sample. Then the density $d_o$ of the applied ink composition on the paper was measured by a Macbeth densitometer. This test sample was immersed in water at a temperature of 30° C. for one minute and was then taken out. Immediately after this, the density d of the ink composition applied on the immersed paper was measured by the Macbeth densitometer. From the above measured $d_0$ and $d_1$, the resistance to water of the ink composition was determined in accordance with the following formula:

$$\frac{d_0 - d_1}{d_0} \times 100\%$$

The result was that the water resistance of the ink composition No. 1 was 4.8% in terms of the above defined fading ratio.

Likewise, the light resistance of the ink composition No. 1 was measured as follows:

A test sample having an applied ink density $d_0$ was prepared in the same manner as described above.

This test sample was exposed to the light of a carbon arc lamp by a fade meter at 63° C. for 3 hours and the density $d_2$ of the ink composition of the test sample was measured by the Macbeth densitometer. From the $d_0$ and $d_2$, the resistance to light of the ink composition No. 1 was determined by the following formula:

$$\frac{d_0 - d_2}{d_0} \times 100\%$$

The result was that the light resistance of the ink composition No. 1 was 8.5% in terms of the above defined fading ratio.

The aqueous ink composition No. 1 was then subjected to the following ink-jet performance tests:

(1) Image Clarity and Image Dryness Test The ink composition was caused to issue from a nozzle with an inner diameter of 30 μm, with vibrations at a frequency of 1100 KHz, by which vibrations the ink composition was ejected in a stream broken into individual drops, and was then caused to impinge on a sheet of commercially available high quality paper. As a result, clear images were obtained on each of the sheet. The time required for drying the printed image was not more than 10 seconds at normal room temperature and humidity.

(2) Preservability Test

Samples of the ink composition were tightly sealed in glass containers and subjected to the following storage tests:
 a. Preserved at −20° C. for one month;
 b. Preserved at 4° C. for one month;
 c. Preserved at 20° C. for one year; and
 d. Preserved at 90° C. for one week.

Separation of precipitates from the ink composition was not observed at all in storage. In addition, no changes were detected in the properties or color of the ink composition.

(3) Ink Droplet Ejection Stability Test

Ink-jet recording as was done in the above-described Image Clarity and Image Dryness Test was continuously carried out for 1,000 hours. There was no evidence of either clogging of the nozzle or change in ejection direction of the ink droplets; rather, stable recording was maintained.

(4) Ink Droplet Ejection Response Test

After ink-jet recording was performed as outlined in (1), the apparatus and ink composition were allowed to stand at at room temperature and humidity for one month, after which they were used again to perform ink-jet recording under the same conditions as previously stated in (1). As in (3) above, there was no change in the ink droplet ejection stability.

The above test was repeated in the same manner, except that the apparatus and ink were allowed to stand at 40° C./30% RH for one week, instead of being allowed to stand at room temperature and humidity for one month. The result was that again no change was observed in the ink droplet ejection stability.

EXAMPLE 2

The procedure for Example 1 was repeated except that the formulation of Example 1 was replaced by the following formulation, whereby an aqueous ink composition No. 2 according to the present invention was prepared:

|  | wt. % |
| --- | --- |
| Dye No. 9 in Table 1 | 3.0 |
| Diethylene glycol | 15.0 |
| Glycerin | 5.0 |
| Sodium dehydroacetate | 0.1 |
| Ion-exchanged water | 76.9 |

EXAMPLE 3

The procedure for Example 1 was repeated except that the formulation of Example 1 was replaced by the following formulation, whereby an aqueous ink composition No. 3 according to the present invention was prepared:

|  | wt. % |
| --- | --- |
| Dye No. 12 in Table 1 | 3.0 |
| Diethylene glycol | 15.0 |
| Glycerin | 5.0 |
| Sodium dehydroacetate | 0.1 |
| Ion-exchanged water | 76.9 |

EXAMPLE 4

The procedure for Example 1 was repeated except that the formulation of Example 1 was replaced by the following formulation, whereby an aqueous ink composition No. 4 according to the present invention was prepared:

|  | wt. % |
| --- | --- |
| Dye No. 22 in Table 1 | 3.0 |
| Triethylene glycol | 10.0 |
| 2,2'-thiodiethanol | 10.0 |
| Sodium benzoate | 0.2 |
| Ion-exchanged water | 76.8 |

EXAMPLE 5

The procedure for Example 1 was repeated except that the formulation of Example 1 was replaced by the following formulation, whereby an aqueous ink composition No. 5 for ink-jet recording according to the present invention was prepared:

|  | wt. % |
| --- | --- |
| Dye No. 25 in Table 1 | 3.0 |

-continued

| | wt. % |
|---|---|
| Polyethylene glycol 200 | 5.0 |
| Triethylene glycol monomethyl ether | 15.0 |
| Sodium benzoate | 0.2 |
| Ion-exchanged water | 76.8 |

COMPARATIVE EXAMPLE 1

The procedure for Example 1 was repeated except that the formulation of Example 1 was replaced by the following formulation, whereby a comparative aqueous ink composition No. 1 was prepared:

| | wt. % |
|---|---|
| C.I. Acid Red 35 | 3.0 |
| Diethylene glycol | 15.0 |
| Glycerin | 5.0 |
| Sodium dehydroacetate | 0.1 |
| Ion-exchanged water | 76.9 |

COMPARATIVE EXAMPLE 2

The procedure for Example 1 was repeated except that the formulation of Example 1 was replaced by the following formulation, whereby a comparative aqueous ink composition No. 2 was prepared.

| | wt. % |
|---|---|
| C.I. Acid Red 92 | 3.0 |
| Diethylene glycol | 15.0 |
| Glycerin | 5.0 |
| Sodium dehydroacetate | 0.1 |
| Ion-exchanged water | 76.9 |

COMPARATIVE EXAMPLE 3

The procedure for Example 1 was repeated except that the formulation of Example 1 was replaced by the following formulation, whereby a comparative aqueous ink composition No. 3 was prepared:

| | wt. % |
|---|---|
| C.I. Direct Red 227 | 3.0 |
| Diethylene glycol | 15.0 |
| Glycerin | 5.0 |
| Sodium dehydroacetate | 0.1 |
| Ion-exchanged water | 76.9 |

The properties of the ink compositions No. 1 through No. 5 according to the present invention and the comparative ink compositions No. 1 to No. 3 are summarized in Table 2.

TABLE 2

| | pH (25° C.) | Viscosity (CP) (25° C.) | Surface Tension (dyne/cm) (25° C.) | Water Resistance (Fading Ratio) (%) | Light Resistance (Fading Ratio) (%) |
|---|---|---|---|---|---|
| Example No. 1 | 10.1 | 1.95 | 56.0 | 4.8 | 8.5 |
| Example No. 2 | 10.2 | 1.99 | 54.5 | 6.5 | 7.2 |
| Example No. 3 | 9.8 | 2.05 | 54.5 | 5.0 | 10.4 |
| Example No. 4 | 10.0 | 1.95 | 55.5 | 6.8 | 10.1 |
| Example No. 5 | 10.2 | 1.98 | 54.0 | 7.5 | 5.9 |
| Comparative Example No. 1 | 9.8 | 1.98 | 55.5 | 20.0 | 12.8 |
| Comparative Example No. 2 | 10.2 | 1.88 | 50.5 | 40.0 | 30.0 |
| Comparative Example No. 3 | 10.0 | 2.20 | 53.0 | 5.0 | 15.0 |

Aqueous ink compositions No. 2 through No. 5 according to the present invention and comparative ink compositions No. 1 through No. 3 were also subjected to the same ink droplet ejection response tests as were done in Example 1.

With respect to aqueous ink compositions No. 2 through No. 5, the same excellent results were obtained as in Example 1. However, when comparative ink compositions No. 1 through No. 3 were employed, the nozzles became partially clogged when the apparatus and ink composition were allowed to stand at normal room temperature and humidity for one week, and when the apparatus and ink composition were allowed to stand at 40° C./30% RH for three days, the direction of ejected ink droplets became extremely unstable and normal ink-jet recording was impossible.

What is claimed is:

1. An aqueous ink composition comprising (i) a water-soluble dye having the formula (I) in an amount sufficient for ink printing and (ii) water,

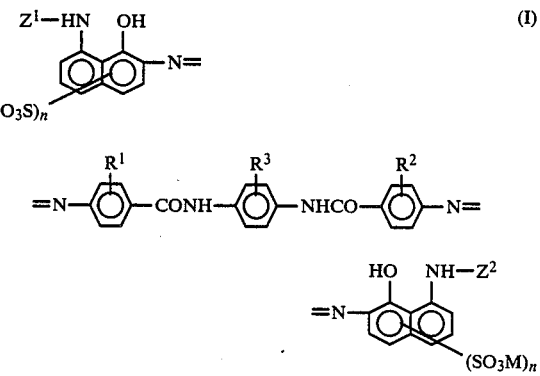

wherein $R^1$ and $R^2$ each represent hydrogen, a lower alkyl group, a lower alkoxy group or halogen; $R^3$ represents hydrogen, a lower alkyl group, a lower alkoxy group, halogen, a sulfonic acid group or a sulfonate group; $Z^1$ and $Z^2$ each represent hydrogen, a lower alkyl group, a phenyl group, an acetyl group, an alkyl sulfonyl group, a benzoyl group which may have a substitutent selected from the group consisting of a lower alkyl group, a lower alkoxy group and halogen, a benzenesulfonyl group which may have a substituent selected from the group consisting of a lower alkyl group, a lower alkoxy group and halogen, or a 1,3,5- triazine group which may have a substituent selected from the group consisting of an alkyl group, an alkoxy group, a hydroxyl group, halogen, a hydroxyalkyl amino group, an alkyl amino group and an aromatic amino group; M represents hydrogen, an alkali metal or $NH_4^+$; and n is an integer of 1 or 2.

2. The aqueous ink composition as claimed in claim 1, wherein the amount of said dye is in the range of 0.5 to 20 parts by weight with respect to 100 parts by weight of said aqueous ink composition.

3. The aqueous ink composition as claimed in claim 1, further comprising a humectant selected from the group consisting of a polyhydric alcohol and an alkyl ether thereof, and the mount of said humectant is in the range of 5 to 80 parts by weight with respect to 100 parts by weight of said aqueous ink composition.

4. The aqueous ink composition as claimed in claim 1, further comprising a humectant selected from the group consisting of triethanol amine, dimethylformamide, N-methyl-2-pyrrolidone, 2-pyrrolidone and 1,3-dimethyl imidazolidinone, dimethylformamide and triethanolamine and the amount of said humectant is in the range of 5 to 80 parts by weight with respect to 100 parts by weight of said aqueous ink composition.

5. The aqueous ink composition as claimed in claim 1, further comprising a preservative and anti-mold agent selected from the group consisting of sodium dehydroacetate, sodium benzoate, 2-pyridine thiol-1-oxide sodium salt and sodium pentachlorophenol.

6. The aqueous ink composition as claimed in claim 3, wherein said polyhydric alcohol is selected from the group consisting of ethylene glycol, diethylene glycol, triethylene glycol, polyethylene glycol, polypropylene glycol and glycerin.

7. The aqueous ink composition as claimed in claim 3, wherein said alkyl ether of polyhydric alcohol is selected from the group consisting of ethylene glycol monoethyl ether, ethylene glycol monobutyl ether, diethylene glycol monomethyl ether, diethylene glycol monoethyl ether, diethylene glycol monobutyl ether, triethylene glycol monomethyl ether and triethylene glycol monoethyl ether.

8. The aqueous ink composition as claimed in claim 1, wherein said water-soluble dye is selected from the group consisting of:

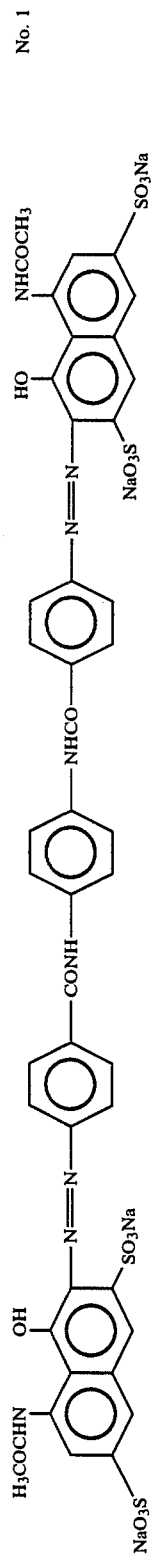
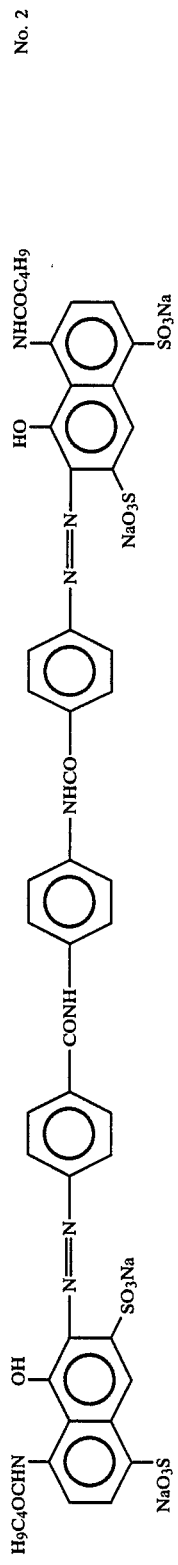
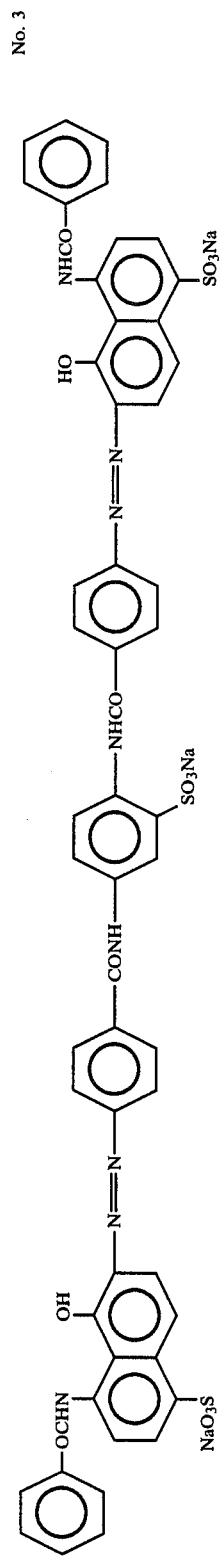
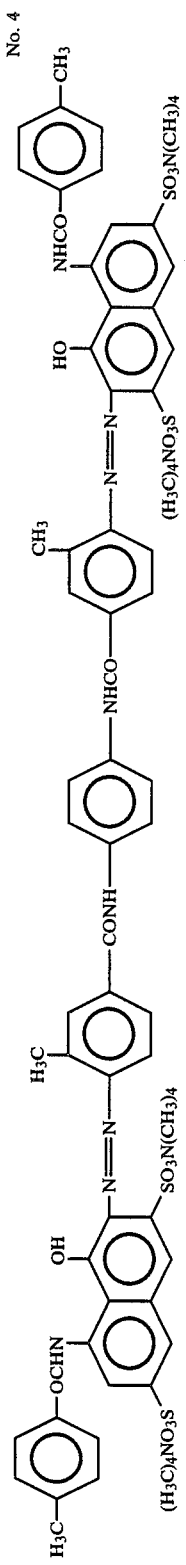
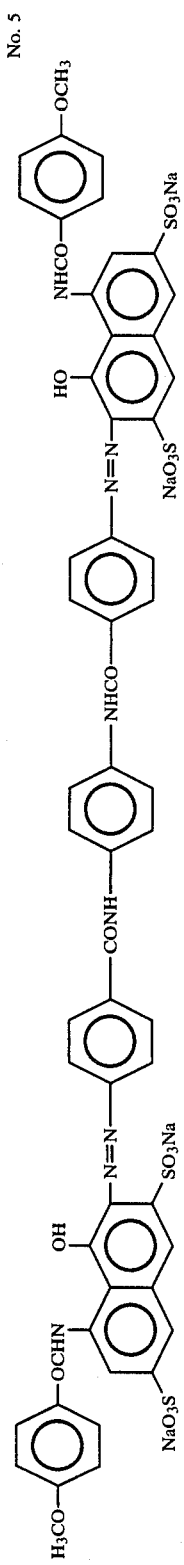

-continued
No. 6
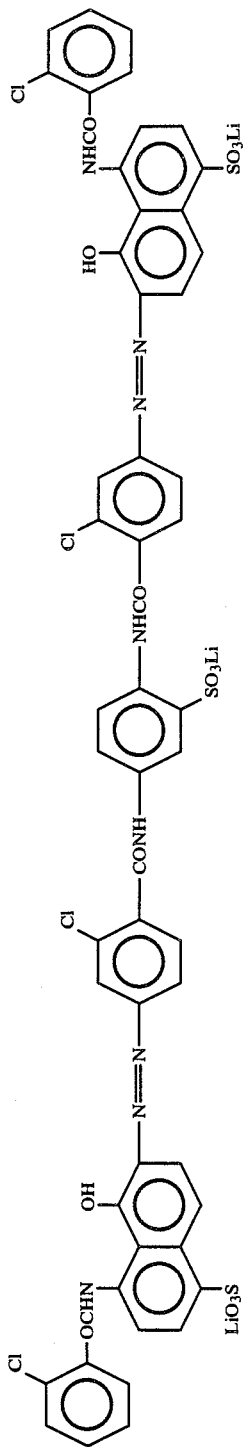
No. 7
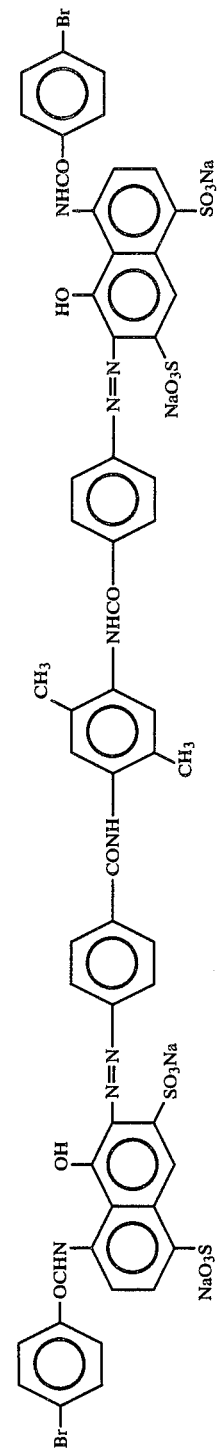
No. 8
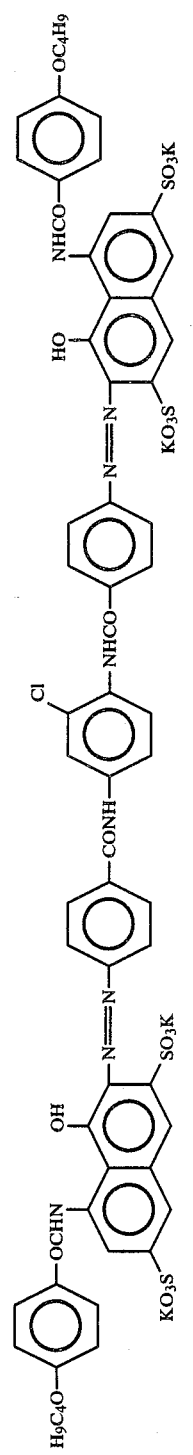
No. 9
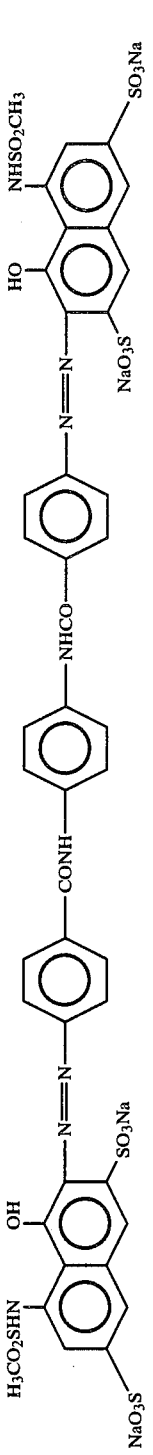
No. 10
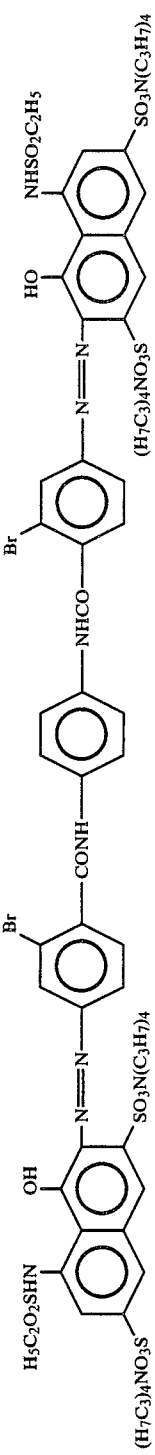

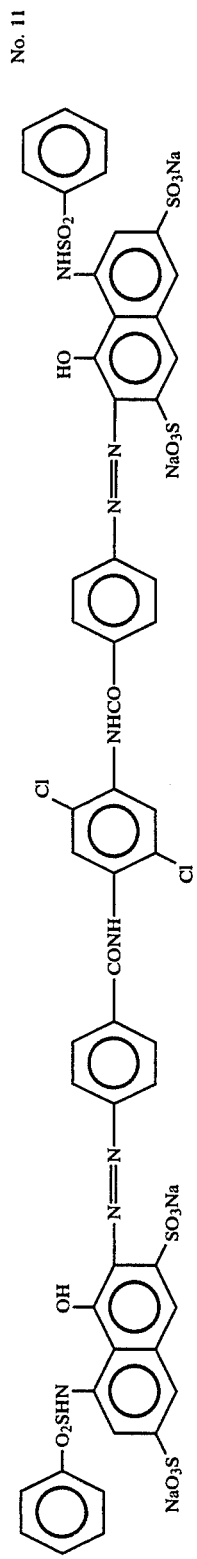
No. 11
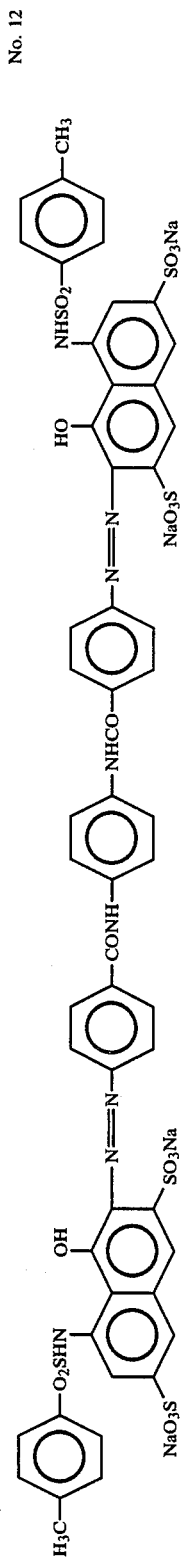
No. 12
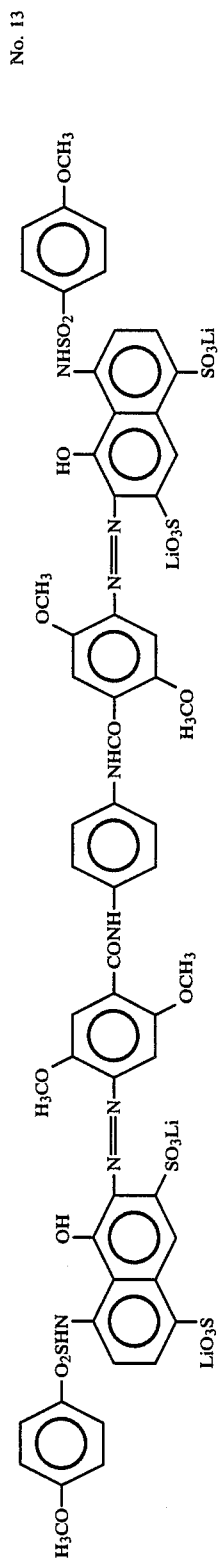
No. 13
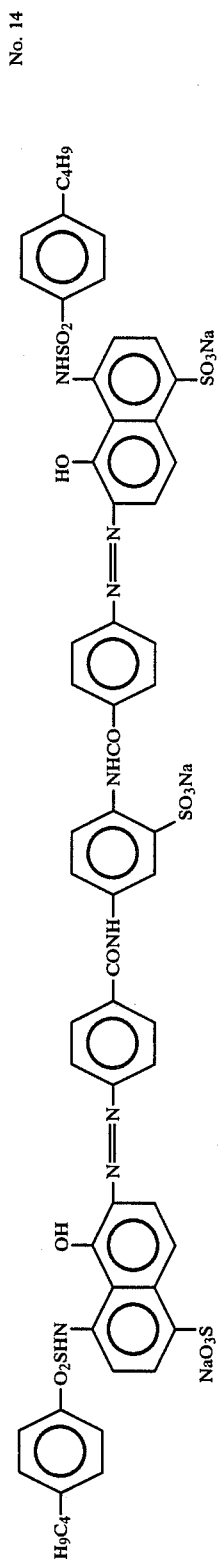
No. 14
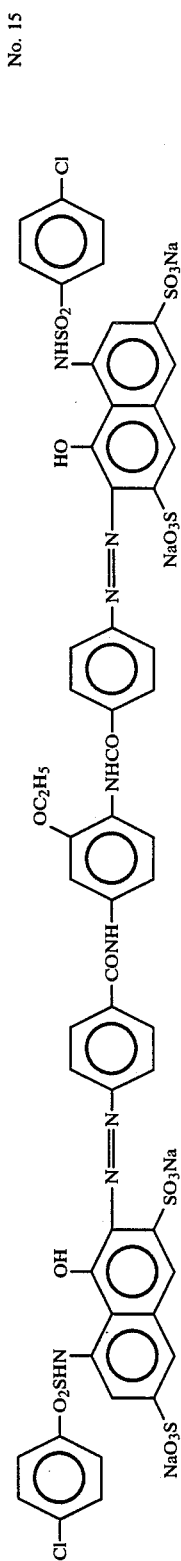
No. 15

-continued
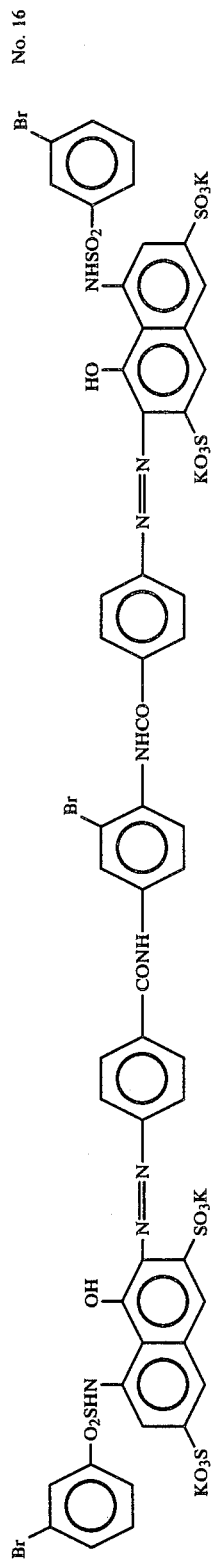
No. 16
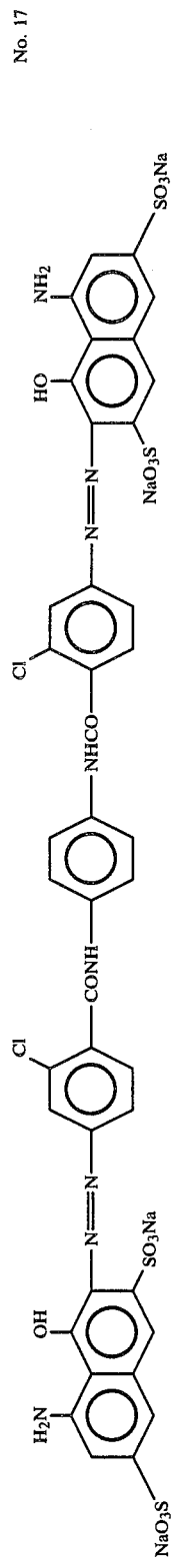
No. 17
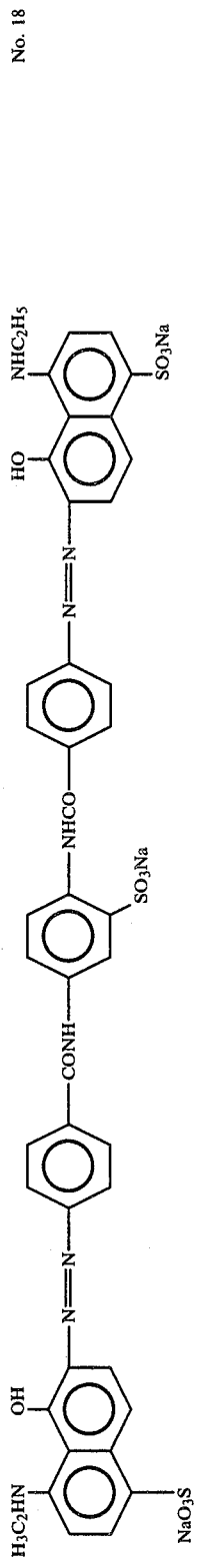
No. 18
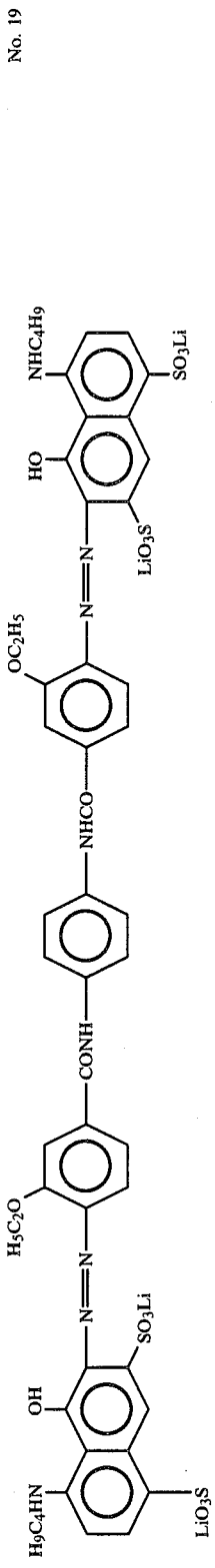
No. 19
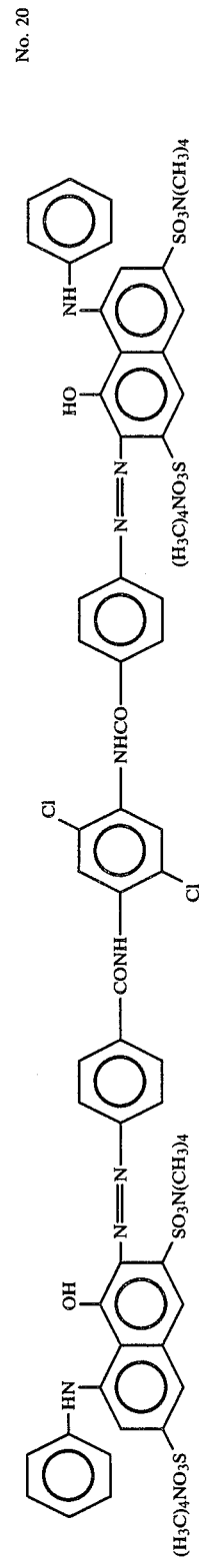
No. 20

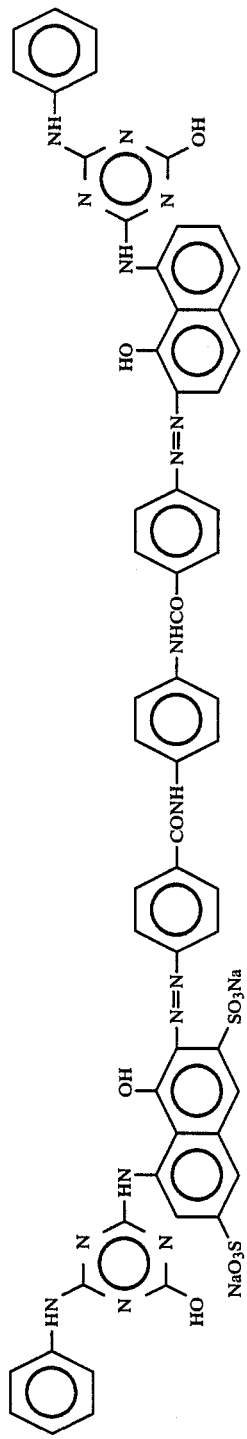
No. 21
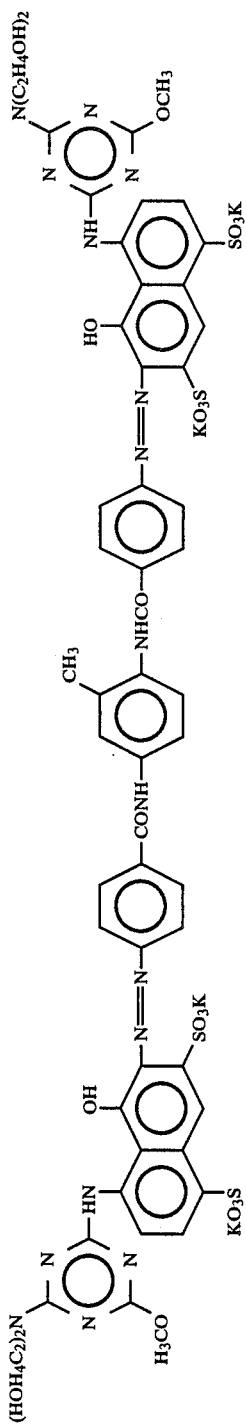
No. 22
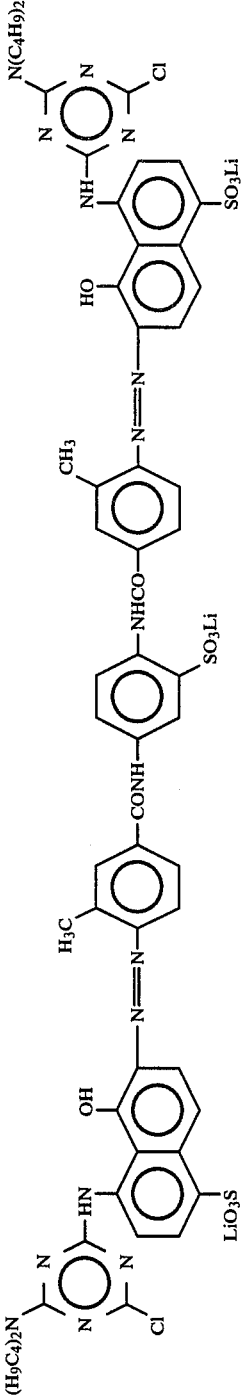
No. 23
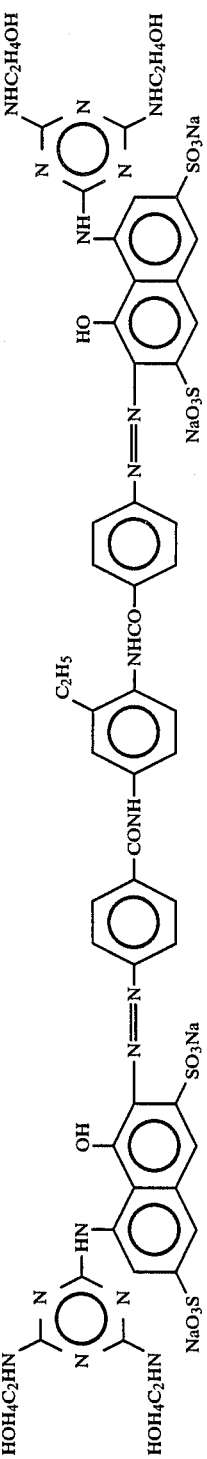
No. 24

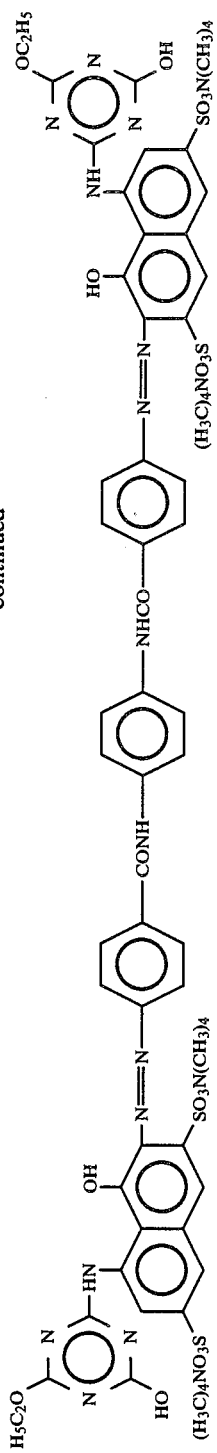

* * * * *